(12) United States Patent
Miucic

(10) Patent No.: US 8,521,412 B2
(45) Date of Patent: Aug. 27, 2013

(54) METHOD OF DETERMINING ABSOLUTE POSITION FOR A MOTOR VEHICLE

(75) Inventor: Radovan Miucic, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 612 days.

(21) Appl. No.: 12/732,347

(22) Filed: Mar. 26, 2010

(65) Prior Publication Data

US 2011/0238306 A1 Sep. 29, 2011

(51) Int. Cl.
*G06F 19/00* (2006.01)

(52) U.S. Cl.
USPC ............ 701/300; 701/301; 701/36; 701/412

(58) Field of Classification Search
USPC ................... 701/300, 301, 36, 412
See application file for complete search history.

(56) References Cited

U.S. PATENT DOCUMENTS

| | | | |
|---|---|---|---|
| 5,841,399 A | 11/1998 | Yu | |
| 6,370,475 B1 | 4/2002 | Breed et al. | |
| 6,405,132 B1 | 6/2002 | Breed et al. | |
| 6,526,352 B1 | 2/2003 | Breed et al. | |
| 6,679,702 B1 | 1/2004 | Rau | |
| 6,720,920 B2 | 4/2004 | Breed et al. | |
| 6,756,915 B2 | 6/2004 | Choi | |
| 6,768,944 B2 | 7/2004 | Breed et al. | |
| 6,965,816 B2 | 11/2005 | Walker | |
| 7,085,637 B2 | 8/2006 | Breed et al. | |
| 7,110,880 B2 | 9/2006 | Breed et al. | |
| 7,202,776 B2 | 4/2007 | Breed | |
| 7,215,255 B2 | 5/2007 | Grush | |
| 7,295,925 B2 | 11/2007 | Breed et al. | |
| 7,302,339 B2 | 11/2007 | Gray | |
| 7,355,525 B2 | 4/2008 | Tengler et al. | |
| 7,418,346 B2 | 8/2008 | Breed et al. | |
| 7,426,437 B2 | 9/2008 | Breed et al. | |
| 7,427,929 B2 | 9/2008 | Bauer et al. | |
| 7,433,773 B2 | 10/2008 | Tengler et al. | |
| 7,444,227 B2 | 10/2008 | Tengler et al. | |
| 7,486,199 B2 | 2/2009 | Tengler et al. | |
| 7,523,000 B2 | 4/2009 | Tengler et al. | |
| 2002/0040270 A1 | 4/2002 | Kwak et al. | |
| 2003/0191568 A1* | 10/2003 | Breed | ............... 701/36 |
| 2004/0204850 A1 | 10/2004 | MacNeille et al. | |
| 2005/0080520 A1 | 4/2005 | Kline et al. | |
| 2005/0192746 A1 | 9/2005 | King et al. | |

(Continued)

FOREIGN PATENT DOCUMENTS

JP 4013920 1/1992

OTHER PUBLICATIONS

Nasipuri, et al. "A Directionality based Location Discovery Scheme for Wireless Sensor Networks" WSNA-02 Sep. 28, 2002, Atlanta, Georgia, USA, Retrieved online at http://citeseer.ist.psu.edu/viewdoc/summary?doi=10.1.1.11.5199.

(Continued)

*Primary Examiner* — Ronnie Mancho
(74) *Attorney, Agent, or Firm* — Plumsea Law Group, LLC

(57) ABSTRACT

A method of determining an absolute position for a motor vehicle is disclosed. The method includes steps of receiving information related to the absolute positions of one or more remote sources. The method further includes steps of determining distances to the one or more remote sources. Methods for selecting a subset of remote sources from a set of all available remote sources to be used in determining an absolute position for the motor vehicle are also disclosed.

24 Claims, 16 Drawing Sheets

(56) References Cited

U.S. PATENT DOCUMENTS

| | | |
|---|---|---|
| 2008/0015771 A1 | 1/2008 | Breed et al. |
| 2008/0027635 A1 | 1/2008 | Tengler et al. |
| 2008/0027636 A1 | 1/2008 | Tengler et al. |
| 2008/0040023 A1 | 2/2008 | Breed et al. |
| 2008/0040029 A1 | 2/2008 | Breed |
| 2008/0042815 A1 | 2/2008 | Breed |
| 2008/0106436 A1 | 5/2008 | Breed |
| 2008/0122605 A1 | 5/2008 | Tengler et al. |
| 2008/0122652 A1 | 5/2008 | Tengler et al. |
| 2008/0133136 A1 | 6/2008 | Breed et al. |
| 2008/0136670 A1 | 6/2008 | Tengler et al. |
| 2008/0147253 A1 | 6/2008 | Breed |
| 2008/0154495 A1 | 6/2008 | Breed |
| 2008/0154629 A1 | 6/2008 | Breed et al. |
| 2008/0161986 A1 | 7/2008 | Breed |
| 2008/0161987 A1 | 7/2008 | Breed |
| 2008/0162036 A1 | 7/2008 | Breed |
| 2008/0165018 A1 | 7/2008 | Breed |
| 2008/0167819 A1 | 7/2008 | Breed |
| 2008/0167821 A1 | 7/2008 | Breed |
| 2008/0215202 A1 | 9/2008 | Breed |
| 2008/0215231 A1 | 9/2008 | Breed |
| 2008/0284646 A1 | 11/2008 | Walley et al. |
| 2009/0005977 A1 | 1/2009 | Chung et al. |
| 2009/0030605 A1 | 1/2009 | Breed |
| 2009/0033540 A1 | 2/2009 | Breed et al. |
| 2009/0043506 A1 | 2/2009 | Breed |
| 2009/0048750 A1 | 2/2009 | Breed |
| 2010/0256835 A1* | 10/2010 | Mudalige .................. 701/2 |

OTHER PUBLICATIONS

International Search Report and Written Opinion mailed Jul. 27, 2011 in International Application No. PCT/US2011/28822.
International Preliminary Report on Patentability (including Written Opinion of the ISA) mailed Oct. 11, 2012, in International Application No. PCT/US2011/028822.

* cited by examiner

METHOD OF DETERMINING ABSOLUTE POSITION FOR A MOTOR VEHICLE

BACKGROUND

The present invention relates generally to a motor vehicle, and in particular to a method of determining an absolute position for a motor vehicle.

In some cases, satellite signals can be obstructed by various objects such as buildings, foliage or any other objects that reflect electromagnetic signals. This may often occur in urban settings, where a vehicle may travel around a large number of taller buildings that can obstruct signals. For positioning systems, such as the global position system (GPS), this obstruction of signals may limit the ability of a motor vehicle to determine an absolute position.

The related art lacks provisions for providing an accurate absolute position for a motor vehicle in situations where satellite signals are obstructed.

SUMMARY

In one aspect, the invention provides a method of determining an absolute position for a motor vehicle, comprising the steps of: receiving information related to an absolute position of a remote source; determining if the remote source is in line of sight of the motor vehicle; determining a distance between the remote source and the motor vehicle; and calculating the absolute position for the motor vehicle using the absolute position of the remote source and the distance when the remote source is in line of sight of the motor vehicle.

In another aspect, the invention provides a method of determining an absolute position for a motor vehicle, comprising the steps of: receiving information from a plurality of remote sources, the information including an absolute position for each remote source; selecting a set of remote sources that are in line of sight of the motor vehicle; determining a distance to each remote source in the set of remote sources; selecting a subset of remote sources from the set of remote sources that are spread approximately evenly around the motor vehicle; and calculating the absolute position of the motor vehicle using the absolute position of each remote source in the subset of remote sources and using the distance to each remote source in the subset of remote sources.

In another aspect, the invention provides a method of determining an absolute position for a motor vehicle, comprising the steps of: receiving information from a plurality of remote sources, the information including an absolute position for each remote source; selecting a set of remote sources that are in line of sight of the motor vehicle; determining a distance to each remote source in the set of remote sources; calculating a first absolute position for the motor vehicle using the set of remote sources with a first remote source excluded; calculating a second absolute position for the motor vehicle using the set of remote sources with a second remote source excluded; removing at least one remote source from the set of remote sources using information related to the first absolute position and the second absolute position; and recalculating the absolute position of the motor vehicle using the set of remote sources.

By calculating the absolute position for the motor vehicle using different subsets of remote sources, bad reference points can be eliminated in a process of fault detection and exclusion. In some cases, the method determines if a bad position calculation is caused by a particular remote source. In such cases, the remote source may be excluded from the calculation of the absolute position of the motor vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Figure 1:
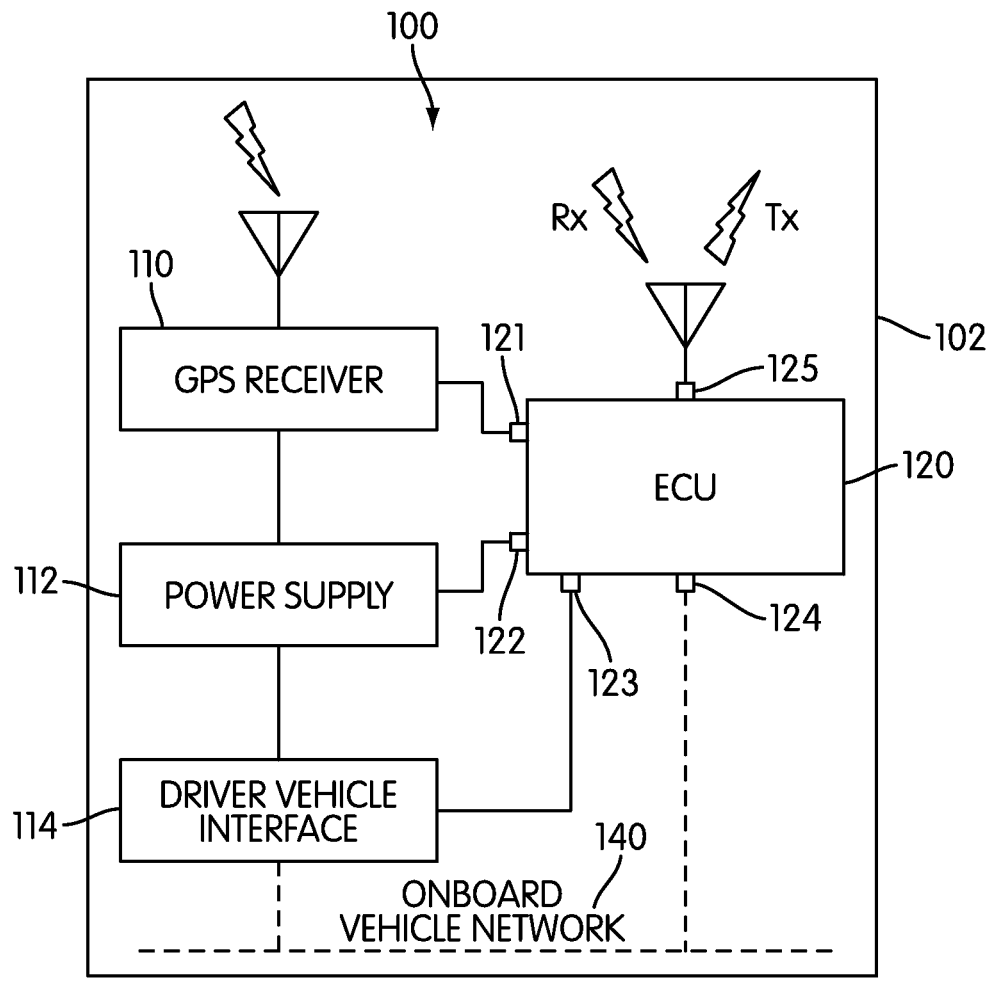
FIG. 1 is a schematic view of an embodiment of components for a motor vehicle.
Figure 2:
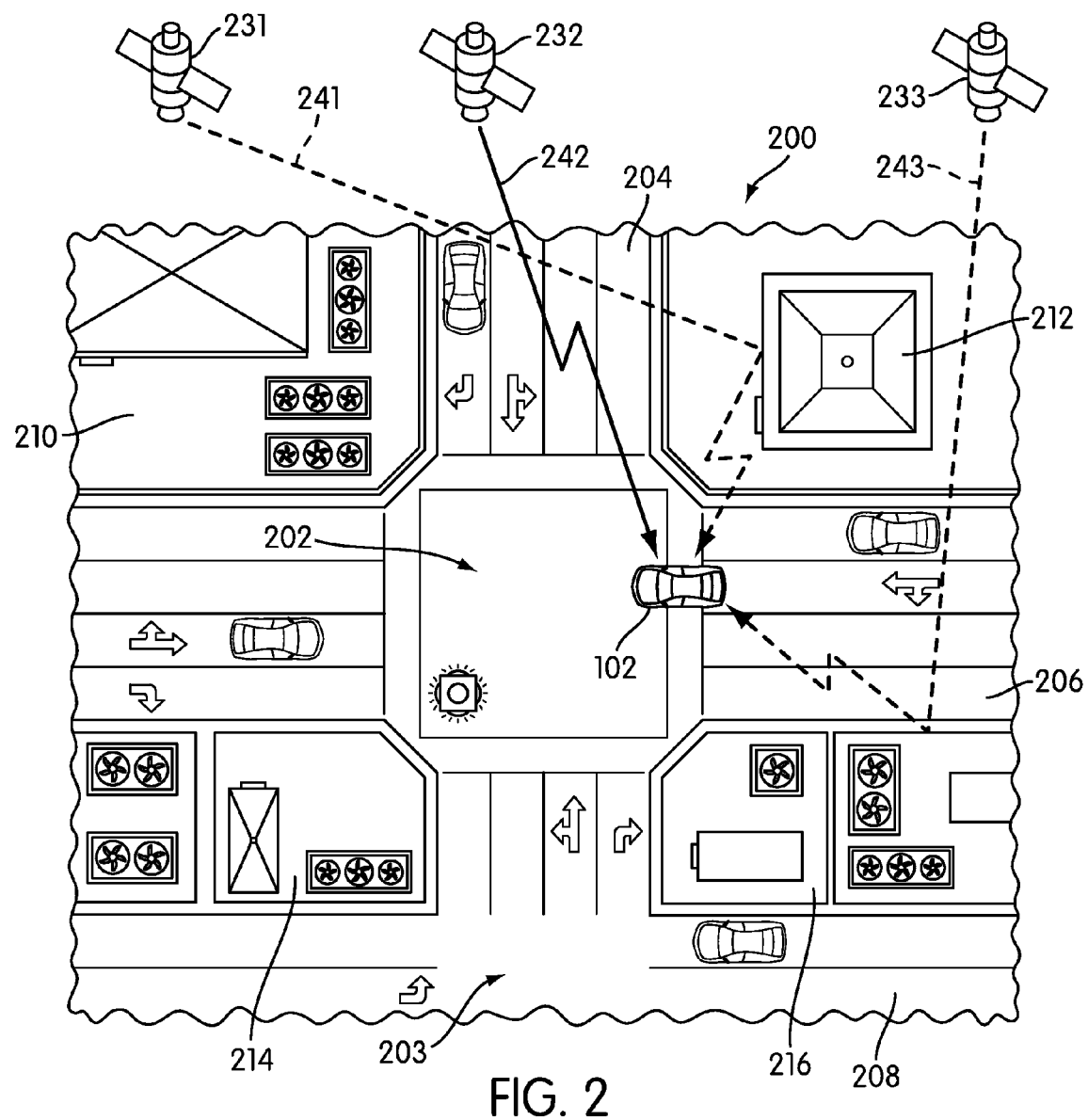
FIG. 2 is a schematic view of an embodiment of a motor vehicle configured to receive navigation information from satellites.

FIG. 1 is a schematic view of an embodiment of communication system 100 for motor vehicle 102. For purposes of clarity, only some components of a motor vehicle may be shown. Furthermore, in other embodiments, additional components can be added or removed. Communication system 100 may include provisions for communicating various kinds of information between motor vehicle 102 and any other remote source capable of exchanging information including, but not limited to: other vehicles, roadside units as well as other sources. Communication system 100 can be used with one or more systems of a motor vehicle. In some embodiments, communication system 100 could be used in conjunction with a navigation system to determine the locations of other vehicles as well as the locations of traffic signals or other roadway infrastructure. In other embodiments, communication system 100 could be used with a vehicle safety system. Examples of vehicle safety systems include collision warning systems, lane departure warning systems as well as other types of safety systems. For example, a collision warning system could be configured to receive information from other vehicles using communication system 100 to determine the locations of other vehicles and to provide alerts to a driver of any potential collisions. In an exemplary embodiment, communication system 100 can be used to determine a position for motor vehicle 102, including relative positions and/or absolute positions.

Motor vehicle 102 can include provisions for receiving navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Motor vehicle 102 can include provisions for receiving information from an absolute positioning system. The term "absolute positioning system" as used throughout this detailed description and in the claims refers to any type of positioning system that provides absolute positions with respect to some standard coordinate system. For example, the global positioning system provides absolute coordinates for any systems configured to receive GPS information from GPS satellites. It will be understood, however, that the embodiments are not limited to use with a particular absolute positioning system and in other embodiments any other absolute positioning systems could be used.

In some cases, motor vehicle 102 can include GPS receiver 110. In an exemplary embodiment, GPS receiver 110 can be used for gathering GPS information for any systems of a motor vehicle, including, but not limited to: GPS based navigation systems. In other embodiments, another type of receiver could be included for use with another absolute positioning system.

Motor vehicle 102 can include provisions for powering one or more devices. In some cases, motor vehicle 102 can include power supply 112. Generally, power supply 112 can be any type of power supply associated with a motor vehicle. In some cases, power supply 112 can be a car battery. In other cases, power supply 112 can be another type of power supply available within motor vehicle 102. Although power supply 112 is shown as connected to some components of motor vehicle 102 in the current embodiment, it will be understood that in other embodiments additional components can be connected to power supply 112. In still other cases, some components that are shown as connected to power supply in the current embodiment 112 may not be connected to power supply 112 in other embodiments.

Motor vehicle 102 can include provisions for communicating with a driver. In some embodiments, motor vehicle 102 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger. It will be further understood that in some embodiments, a driver vehicle interface can be associated directly with a navigation system of a motor vehicle. In other words, in some embodiments, a driver vehicle interface can be combined, or integrated into, a navigation system. With this arrangement, information communicated between a driver and one or more systems of a motor vehicle can be accomplished using an interface of a navigation system.

Motor vehicle 102 may include provisions for communicating, and in some cases controlling, the various components associated with motor vehicle 102. In some embodiments, motor vehicle 102 may be associated with a computer or similar device. In the current embodiment, motor vehicle 102 may include electronic control unit 120, hereby referred to as ECU 120. In one embodiment, ECU 120 may be configured to communicate with, and/or control, various components of motor vehicle 102. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include port 121 for receiving information an absolute positioning system of some kind. In some cases, port 1212 may be configured to communicate with GPS receiver 110. In particular, ECU 120 may be configured to receive GPS information from GPS receiver 110. In addition, ECU 120 can include port 122 for receiving power from power supply 112. Also, ECU 120 can include port 123 for communicating with driver vehicle interface 114. In particular, ECU 120 can be configured to transmit information to driver vehicle interface 114, as well as to receive information from driver vehicle interface 114.

A motor vehicle can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include port 125 that is configured to communicate with one or more DSRC devices. In an exemplary embodiment, port 125 may be associated with a DSRC antenna that is configured to transmit and/or receive vehicle information over one or more vehicle communication networks.

Motor vehicle 102 can include provisions for communicating with one or more components of a motor vehicle that are not associated directly, or indirectly, with motor vehicle 102. In some cases, ECU 120 may include additional ports for communicating directly with one or more additional devices of a motor vehicle, including various sensors or systems of the motor vehicle. In an exemplary embodiment, ECU 120 may include port 124 for communicating with onboard vehicle network 140. By providing communication between ECU 120 and onboard vehicle network 140, ECU 120 may have access to additional information concerning motor vehicle 102. For instance, in some cases, ECU 120 may be configured to receive information related to various operating conditions of a motor vehicle. Examples of information that may be received via onboard vehicle network 140 include, but are not limited to: vehicle speed, engine speed, braking conditions, turning status, steering wheel angle, as well as other parameters associated with the operating condition of motor vehicle 102. In other embodiments, ECU 120 can include provisions for communicating directly with one or more sensors.

Motor vehicles associated with vehicle communication networks can be configured to exchange information. In some embodiments, motor vehicles can exchange basic safety messages (BSMs) via the vehicle communication networks. In some cases, basic safety messages can include information related to the position, motion, control and/or vehicle size of the transmitting vehicle. In other cases, a basic safety message can include additional information. In still other cases, a basic safety message may include less information. By transmitting basic safety messages to surrounding vehicles, each vehicle can exchange information that may be useful in facilitating safety for each driver. In some cases, the information contained in a basic safety message could then be utilized by a particular vehicle to control a vehicle safety system, such as a collision warning system.

Throughout this detailed discussion and in the claims, the term "message" is used to describe any collection or packet of information that is transmitted over a vehicle communication network. Messages could take the form of basic safety messages or may contain additional or less information than a basic safety message. Messages may comprise any number of bytes of information or data.

FIGS. 2 through 5 illustrate schematic views of an embodiment of motor vehicle 102 traveling through urban area 200. Urban area 200 comprises first intersection 202 that is formed by first roadway 204 and second roadway 206. In addition, urban area 200 comprises second intersection 203 that is formed by first roadway 204 and third roadway 208. Furthermore, urban area 200 includes first building 210, second building 212, third building 214 and fourth building 216 at the corners of first intersection 202. It will be understood that first building 210, second building 212, third building 214 and fourth building 216 may have relatively large heights that are much greater than the heights of vehicles traveling through urban area 200.

In order to determine an accurate GPS location for motor vehicle 102, motor vehicle 102 may be in communication with one or more satellites that are configured to transmit GPS information, or other types of absolute positioning information. In the current example, motor vehicle 102 may be within range of first satellite 231, second satellite 232 and third satellite 233. In particular, motor vehicle 102 receives first signal 241, second signal 242 and third signal 243 from first satellite 231, second satellite 232 and third satellite 233, respectively. However, while second signal 242 is received along a direct route from second satellite 232, first signal 241 and third signal 243 may travel along multipath routes. In this situation, motor vehicle 102 may not be able to determine an accurate GPS position. Moreover, motor vehicle 102 may not be able to receive direct signals from any other satellites transmitting GPS information.

A motor vehicle can include provisions for determining the location of the motor vehicle using navigation information, such as GPS information, that is received from various different kinds of sources. For purposes of distinguishing between different vehicles, the terms "host vehicle" and "remote vehicle" are used throughout this detailed description and in the claims. The term "host vehicle" is used to describe any vehicle that performs a particular method, operation or action. In contrast, a "remote vehicle" is any other vehicle about which the host vehicle may receive information. In some cases, the host vehicle may communicate with the remote vehicle using a vehicle communication network. In other cases, the host vehicle can receive information from the remote vehicle using other methods. For example, the host vehicle can receive a relative location for a remote vehicle using a remote detection device. Examples of remote detection devices include, but are not limited to: cameras, radar, lidar, ultrasonic devices as well as any other kind of remote detection devices. In the current embodiment, motor vehicle 102 is a host vehicle that is capable of communicating with one or more remote vehicles. It will be understood that the term host vehicle is a relative term, and that other vehicles may be considered host vehicles in different contexts.

Figure 3:
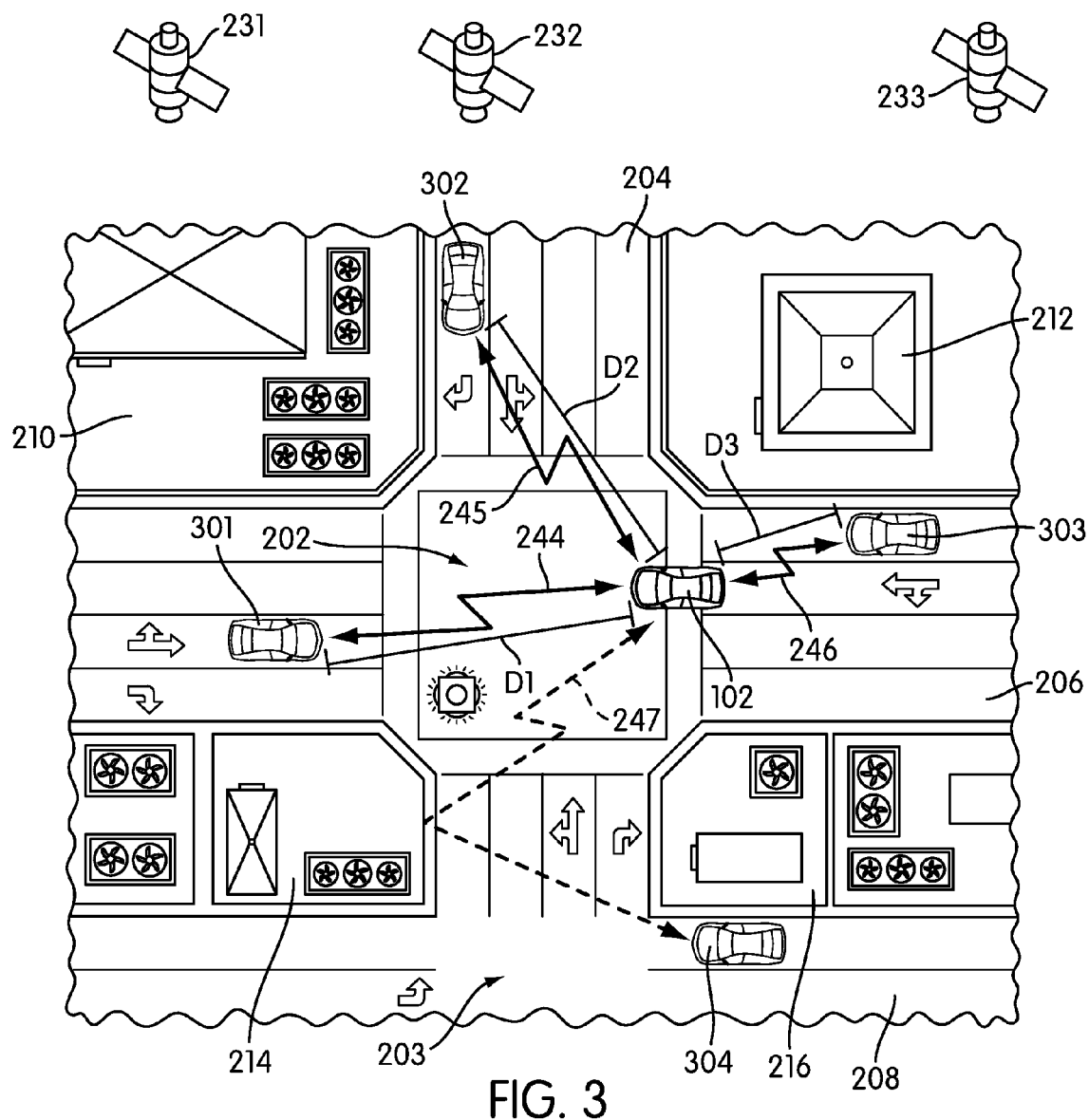
FIG. 3 is a schematic view of an embodiment of a motor vehicle receiving information from multiple remote vehicles.

Referring to FIG. 3, motor vehicle 102 may be configured to receive information from one or more remote vehicles. In the current embodiment, motor vehicle 102 may receive information from first remote vehicle 301, second remote vehicle 302, third remote vehicle 303 and fourth remote vehicle 304. In some cases, the information from each vehicle can be received over a vehicle communications network, such as a DSRC network. In other cases, however, the information can be received from each vehicle in any other manner. The information can be any type of information. In some cases, motor vehicle 102 may receive basic safety messages from first remote vehicle 301, second remote vehicle 302, third remote vehicle 303 and fourth remote vehicle 304. The basic safety messages can include location information such as GPS position for each remote vehicle. In other cases, however, other types of messages or information can be received by motor vehicle 102 from each of the remote vehicles.

Once a signal is received from a remote vehicle, motor vehicle 102 may determine if the remote vehicle is within line of sight of motor vehicle 102. Generally, signals arriving from vehicles not in the line of sight of motor vehicle 102 may arrive along multipath routes that cannot be used for determining an accurate GPS position for motor vehicle 102. Therefore, motor vehicle 102 may include provisions for determining which vehicles are in line of sight. In the current embodiment, motor vehicle 102 receives fourth signal 244, fifth signal 245, sixth signal 246 and seventh signal 247 from first remote vehicle 301, second remote vehicle 302, third remote vehicle 303 and fourth remote vehicle 304, respectively. In this case, fourth signal 244, fifth signal 245 and sixth signal 246 travel on direct paths to motor vehicle 102, while seventh signal 247 travels a multipath route. Therefore, for purposes of computing a GPS position for motor vehicle 102, only information from fourth signal 244, fifth signal 245 and sixth signal 246 may be used.

In different embodiments, different methods of determining if a remote vehicle is within line of sight of motor vehicle 102 can be used. Examples of methods have been previously disclosed in [48-1275—incorporate by ref]. In some cases, signals received from a remote source may be analyzed to determine if the source is within line of sight of the host vehicle. Examples of signal characteristics that may be analyzed to determine line of sight conditions include, but are not limited to: the received signal strength index, the packet success ratio, the antenna diversity correlation, delay spread, the first power component of the signal as well as any other signal characteristics. In still other embodiments, line of sight can be determined using various kinds of sensors including optical devices.

In order to determine a GPS position for motor vehicle 102, the relative distances between motor vehicle 102 and each of first remote vehicle 301, second remote vehicle 302 and third remote vehicle 303 may be determined. Distances to each remote vehicle can be determined using any methods known in the art for determining distances between vehicles. In some cases, one or more sensors can be used to determine the distance from motor vehicle 102 to a nearby vehicle. For example, in some cases, motor vehicle 102 could use a radar or lidar to determine distance to a nearby vehicle. In other cases, motor vehicle 102 could use other methods for determining distances to one or more remote vehicles. In an exemplary embodiment, motor vehicle 102 may use the received signal strength index of a corresponding signal to determine a distance to the remote vehicle that transmitted the signal. Details of this method are discussed in detail below. In still another embodiment, the distance to a remote vehicle could be determined using the time of flight of a signal.

In the current embodiment, motor vehicle 102 may determine that first remote vehicle 301 is a first distance D1 from motor vehicle 102. Similarly, motor vehicle 102 may determine that second remote vehicle 302 and third remote vehicle 303 are distance D2 and distance D3, respectively, from motor vehicle 102. Using this arrangement, the relative position of motor vehicle 102 with respect to first remote vehicle 301, second remote vehicle 302 and third remote vehicle 303 may be determined. Furthermore, since the GPS positions of first remote vehicle 301, second remote vehicle 302 and third remote vehicle 303 are known, the relative position of motor vehicle 102 with respect to these vehicles can be used to determine a GPS position for motor vehicle 102. In some cases, motor vehicle 102 could also receive GPS information from one or more satellites simultaneously with the GPS information received from first remote vehicle 301, second remote vehicle 302 and third remote vehicle 303 for purposes of calculating a GPS position. However, in other cases, motor vehicle 102 may determine a GPS position using only information received from various remote vehicles, especially in situations where satellite signals cannot be received.

Figure 4:
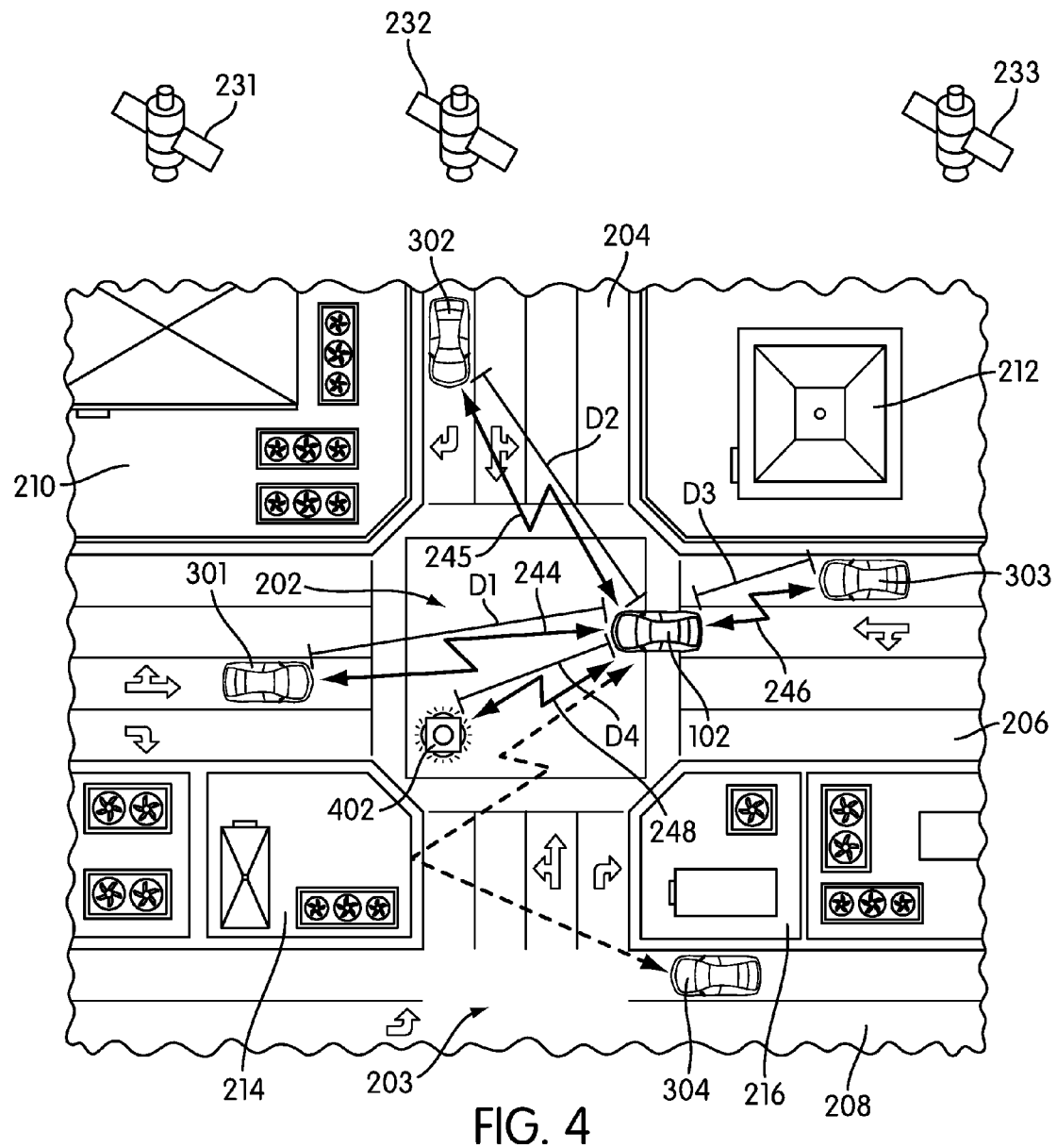
FIG. 4 is a schematic view of an embodiment of a motor vehicle receiving information from multiple remote vehicles and a roadside unit.

Referring to FIG. 4, motor vehicle 102 may also be configured to receive information from one or more roadside units with known GPS positions. In the current embodiment, motor vehicle 102 may receive eighth signal 248 from roadside unit 402. In this embodiment, roadside unit 402 is a traffic signal. Roadside unit 402 may have a known GPS position since the position of roadside unit 402 is fixed. Furthermore, roadside unit 402 may transmit various information, including navigation information through eighth signal 248. In addition, motor vehicle 102 may determine that roadside unit 402 is distance D4 from motor vehicle 102 using any of the methods discussed above. With this arrangement, GPS information received from roadside unit 402 can be used in combination with GPS information received from first remote vehicle 301, second remote vehicle 302 and/or third remote vehicle 303 to determine a GPS position for motor vehicle 102.

Figure 5:
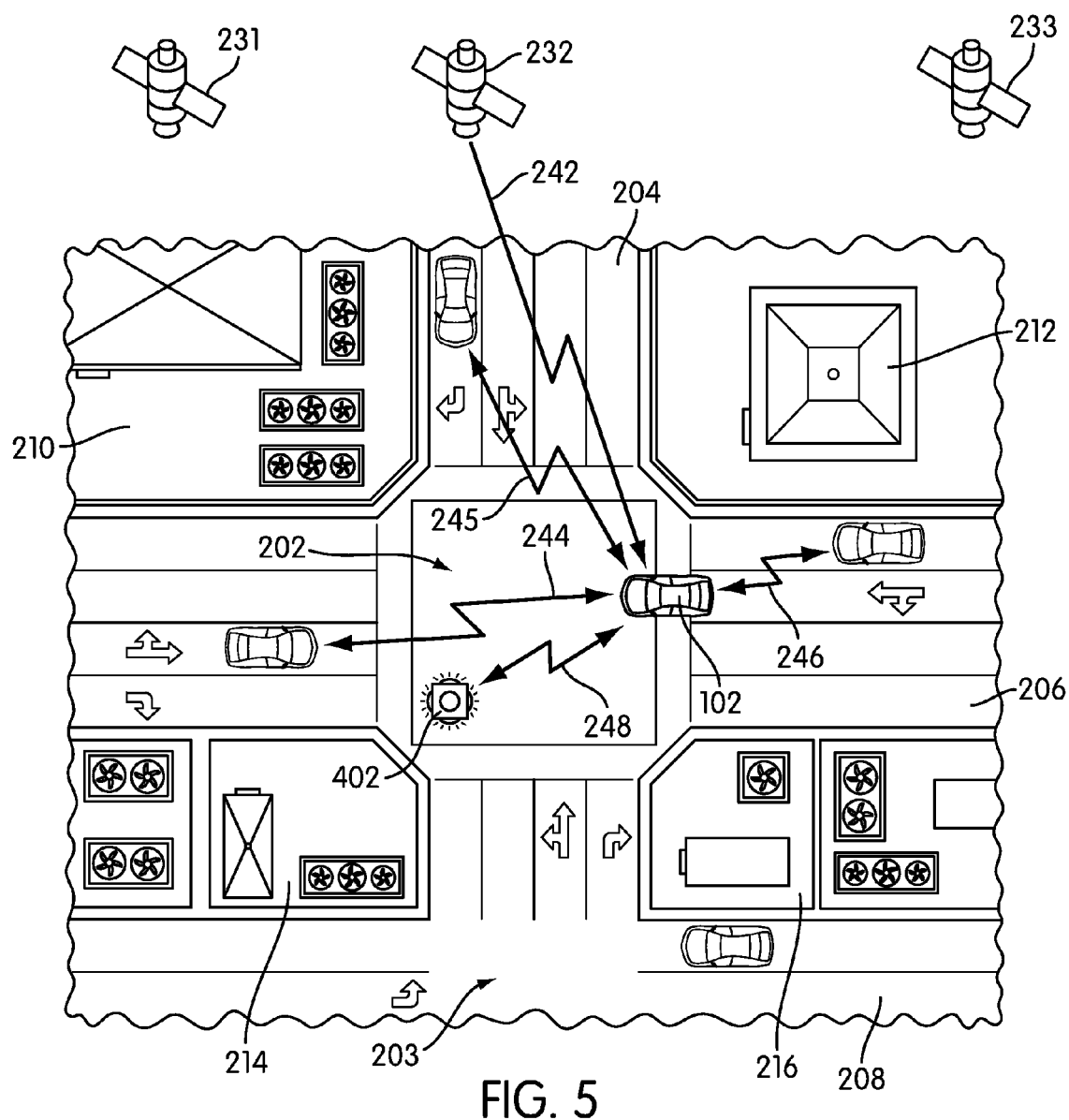
FIG. 5 is a schematic view of an embodiment of a motor vehicle receiving information from multiple remote sources and a satellite.

Referring to FIG. 5, motor vehicle 102 may receive information from a combination of different sources that include satellites, remote vehicles and/or roadside units. For example, in the current embodiment, motor vehicle 102 may receive information form first remote vehicle 301, second remote vehicle 302, third remote vehicle 303, roadside unit 402 and second satellite 232 simultaneously. This arrangement may allow the position of motor vehicle 102 to be precisely determined in situations where fewer than the required number of satellites are available for accurately determining a GPS position.

It will be understood that the number of sources for accurately determining a GPS location can vary. In some embodiments, four or more sources may be required. For example, four satellites are often required to accurately determine the GPS position of a GPS enabled device. In other embodiments, however, less than four sources may be required. In another embodiment, for example, a GPS position may be determined using location information for only three remote vehicles.

In some embodiments, rules for selecting the preferred sources for determining GPS information may be used. For example, in some cases, GPS information from roadside units may be trusted over GPS information from remote vehicles, since the GPS position of a roadside unit is always known and a remote vehicle may provide inaccurate GPS information to a host vehicle. Therefore, in situations where multiple sources are available, GPS information from roadside units may be used over GPS information from remote vehicles. In other embodiments, however, any other rules for selecting preferred sources can be used. In particular, in other embodiments, GPS information from remote vehicles could be used over GPS information from roadside units. Furthermore, in some cases, any GPS information from satellites received via direct path signals may always be used in calculating a GPS position for a host vehicle.

Figure 6:
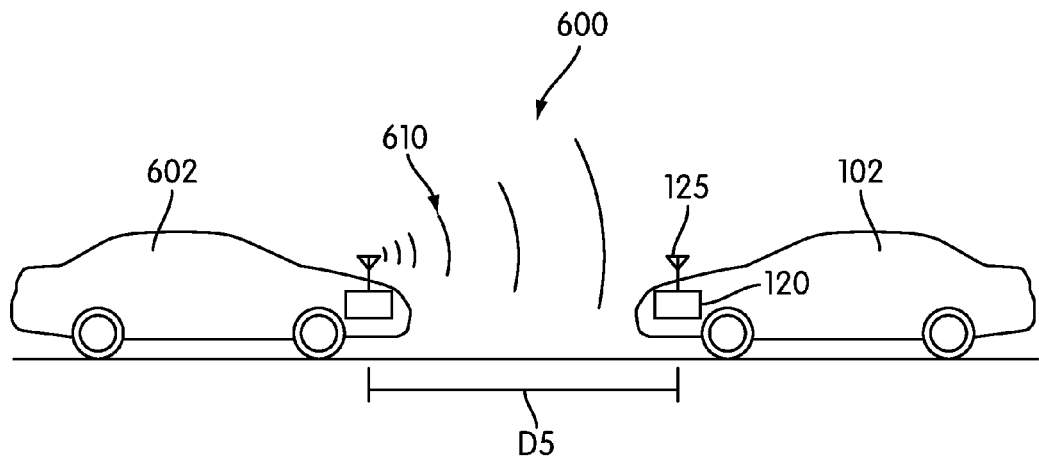
FIG. 6 is a schematic view of an embodiment of a method of determining the distance between two vehicles using information from a signal received over a vehicle communications network.

FIG. 6 illustrates a schematic view of an embodiment of a method of determining the distance between a host vehicle and a remote vehicle. In this embodiment, motor vehicle 102, the host vehicle, is equipped with an antenna for receiving communications over vehicle communications network 600. In particular, motor vehicle 102 includes ECU 120 and port 125 for transmitting and receiving signals over vehicle communications network 600. Furthermore, remote vehicle 602 is also equipped with provisions for communicating over vehicle communications network 600. In some cases, remote vehicle 602 may be provided with substantially similar components to those of motor vehicle 102 that are shown in FIG. 1.

In the current embodiment, signal 610 is transmitted by remote vehicle 602. Signal 610 is then received by motor vehicle 102. By analyzing one or more signal characteristics of signal 610, distance D5 between motor vehicle 102 and remote vehicle 602 can be estimated. Examples of different signal characteristics that can be used to estimate the distance between a host vehicle and a remote source include, but are not limited to: received signal strength index information, time of flight information as well as other signal characteristics that can be used for estimating the distance between a transmitting source and a receiving source. It will be understood that any methods known in the art for using signal characteristics to estimate distance between a transmitting source and a receiving source can be used and the embodiments are not limited to a particular type of signal analysis. In an exemplary embodiment, the received signal strength index (or RSSI) can be used.

Figure 7:
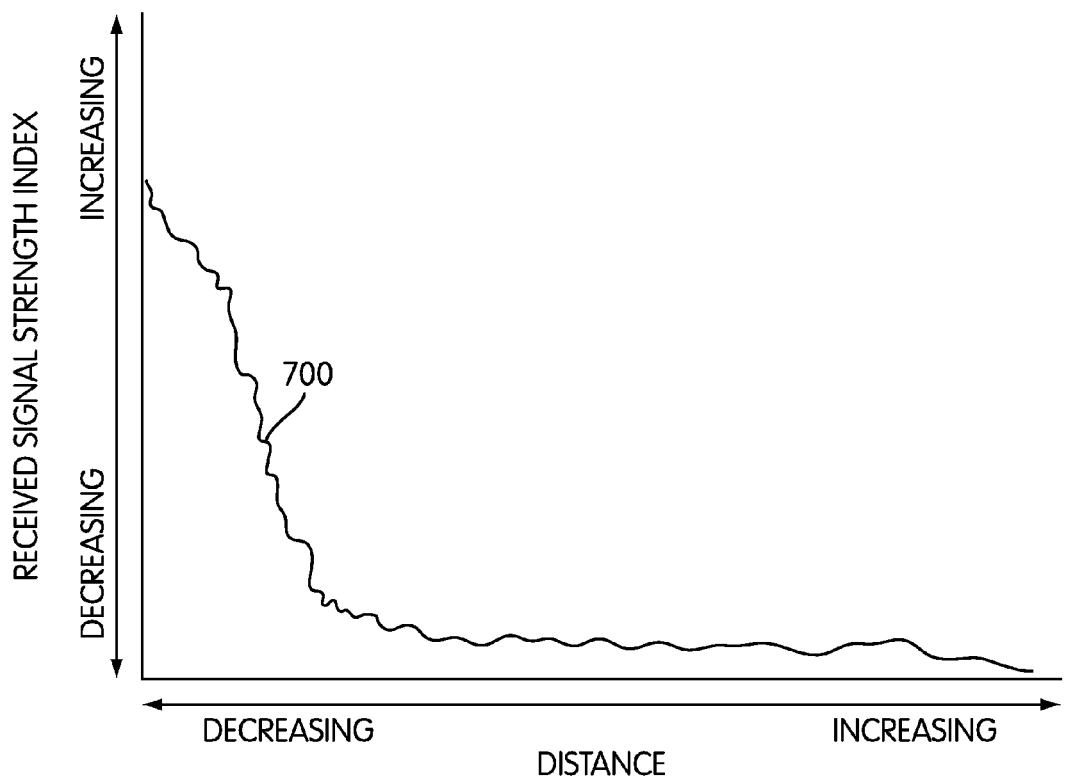
FIG. 7 is an embodiment of a relationship between received signal strength index and distance from a remote source.

FIG. 7 illustrates an embodiment of a relationship between the received signal strength index and distance between transmitting and receiving sources. It will be understood that the relationship shown in FIG. 7 is only intended to be exemplary and in other embodiments the relationship could have substantially different properties. Referring to FIG. 7, received signal strength index 700 may vary as a function of distance to a transmitting source. In particular, as the distance to the transmitting source increases, the value of received signal strength index 700 decreases. In some cases, the decrease may be exponential. In other cases, however, the relationship could have any other linear or nonlinear properties. Using this predetermined relationship, the distance to the transmitting source can be determined from the received signal strength index.

In different embodiments, different signal characteristics related to the received signal strength index can be used for estimating the distance to a source. For example, in one embodiment, the instantaneous received signal strength index can be used. In another embodiment, historical received signal strength index information can be used. Historical received signal strength index information may be any information that includes previous values for the received signal strength index of a signal. In still another embodiment, historical received signal strength index information as well as path information about the host vehicle and the transmitting source can be used.

In some embodiments, characteristics related to the received signal strength index and distance strength profile for each remote vehicle may be different. In some cases, the strength profile for a particular remote vehicle can be recorded in situations where the remote vehicle and the host vehicles are in good line of sight and both have good GPS positions using satellite information. The recorded strength profiles may then be used in bad GPS conditions to help calculate an absolute position for a motor vehicle.

It will be understood that these methods of determining distance could be applied to any remote sources including remote vehicles as well as roadside units. Furthermore, some methods may be utilized for determining distances between a host vehicle and roadside units while other methods may be utilized for determining distances between a host vehicle and remote vehicles.

Figure 8:
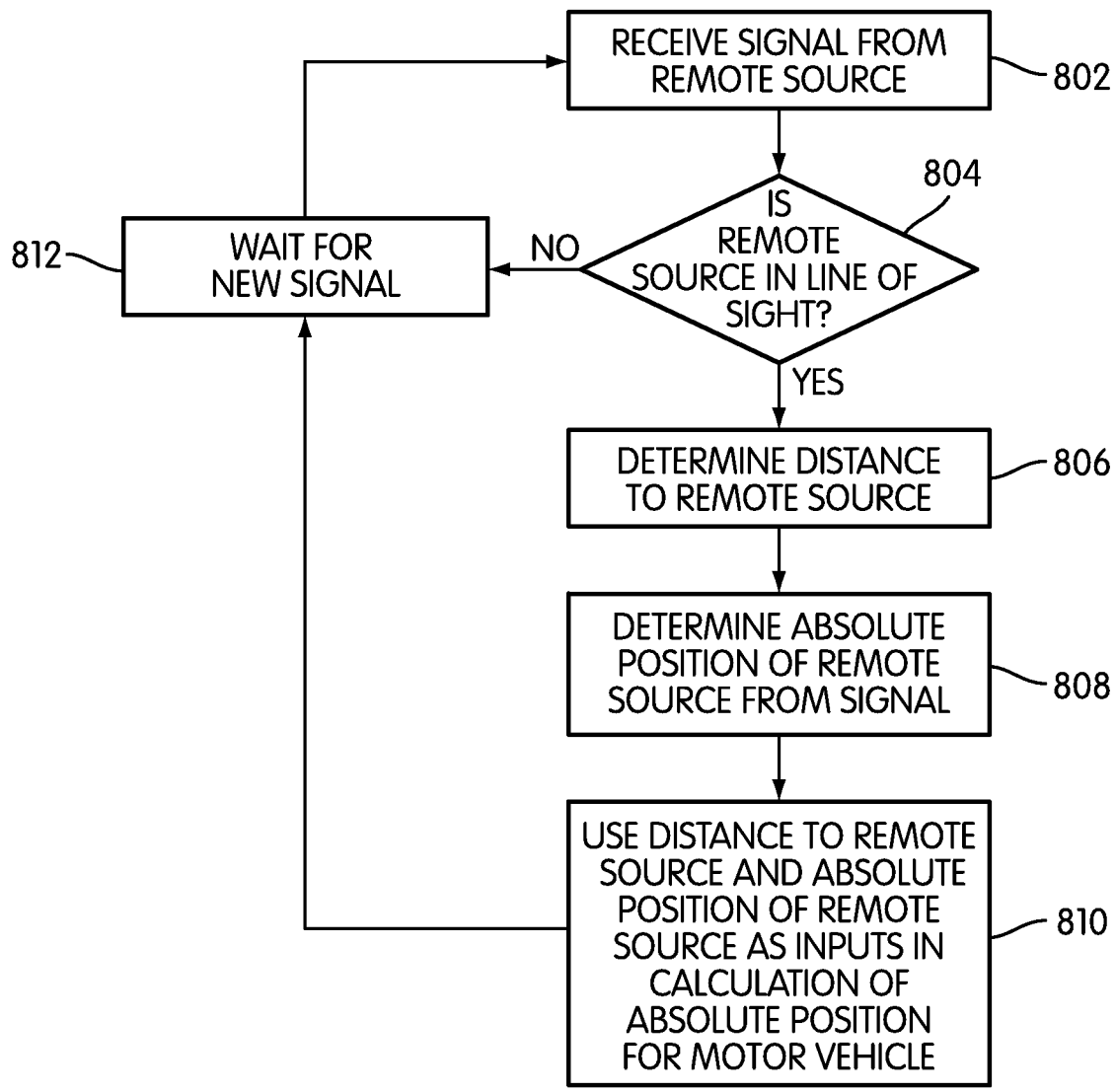
FIG. 8 is an embodiment of a process for determining an absolute position for a motor vehicle.

FIG. 8 illustrates an embodiment of a process for determining an absolute position for a host vehicle using information from one or more remote sources. In some embodiments, some of the following steps could be accomplished by an electronic control unit of the host vehicle. For example, in the current embodiment, one or more steps could be performed by ECU 120 of motor vehicle 102. In other embodiments, some of the following steps could be accomplished by other components of a host vehicle. It will be understood that in other embodiments one or more of the following steps may be optional.

During step 802, ECU 120 may receive a signal from a remote source. As mentioned previously, the remote source could be any source that communicates with motor vehicle 102. In some cases, the remote source could be a remote vehicle. In other cases, the remote source could be a roadside unit. In still other cases, the remote source could be any other kind of source. Next, during step 804, ECU 120 may determine if the remote source is within line of sight of motor vehicle 102. This can be accomplished using any methods discussed above.

If, during step 804, ECU 120 determines that the remote source is not within line of sight of motor vehicle 102, ECU 120 may proceed to step 812. During step 812, ECU 120 waits for a new signal to arrive. Following step 812, ECU 120 may return back to step 802. If, during step 804, ECU 120 determines that the remote source is in line of sight of motor vehicle 102, ECU 120 may proceed to step 806.

During step 806, ECU 120 may determine the distance from motor vehicle 102 to the remote source. In some cases, the distance can be determined using information related to the received signal strength index of the signal. In other cases, the time of flight of the signal can be used to determine the distance. In still other cases, any other signal characteristics of the signal can be used to determine the distance between motor vehicle 102 and the remote source.

Next, during step 808, ECU 120 may determine an absolute position of the remote source form the signal. In some cases, the signal may contain navigation information. In an exemplary embodiment, the signal may include GPS location information about the remote source. In other words, the signal may include the GPS position of the remote source. In other embodiments, however, the signal may contain information related to some other kind of absolute positioning system that may be used to determine an absolute position for the remote source.

Following step 808, during step 810, ECU 120 may use the distance to the remote source and the absolute position of the remote source as inputs to a calculation of the absolute position of motor vehicle 102. In some embodiments, dead reckoning sensors may be used as inputs to the calculation of the absolute position of motor vehicle 102. In other embodiments, integrated motor assist (IMA) sensors may be used as inputs to the calculation of the absolute position of motor vehicle 102. In some cases, ECU 120 may use one or more algorithms to calculate the absolute position of motor vehicle 102 using known absolute positions of various satellites and remote sources.

It will be understood that this method can be repeated to obtain absolute positions for, and relative positions to, various different remote sources. In some cases where the absolute position of a host vehicle may be constantly updated, this method may run continuously. In other cases, this method may be run at fixed intervals of time.

A host vehicle can include provisions for selecting one or more remote sources for use in determining the absolute position of the host vehicle. In particular, the host vehicle may be configured with one or more algorithms for selecting a subset of the available remote sources that provide the most accurate absolute position for the host vehicle. This may be important in urban areas where the host vehicle may be in communication with a large number of remote vehicles that are within line of sight.

FIGS. 9 through 12 illustrate an embodiment of a first method of determining a subset of remote sources to be used to determine an absolute position for a host vehicle. Referring to FIGS. 9 through 12, motor vehicle 102 is traveling through intersection 900 within urban area 902. Furthermore, motor vehicle 102 may be in communication with plurality of remote vehicles 910.

In order to determine an accurate absolute position for motor vehicle 102, only information received from vehicles that are in line of sight of motor vehicle 102 and that have a known absolute position may be considered. In this embodiment, motor vehicle 102 selects set of remote vehicles 920 that are within line of sight and that have known absolute positions. For purposes of illustration, remote vehicles within set of remote vehicles 920 are shown in solid, while remote vehicles not in set of remote vehicles 920 are shown in phantom. For example, in this case, remote vehicle 930 is included in set of remote vehicles 920 that are within the line of sight of motor vehicle 102. In contrast, remote vehicle 932 is not within the line of sight of motor vehicle 102 and therefore has not been selected as part of set of remote vehicles 920.

Once the set of remote vehicles within line of sight and with known absolute positions has been selected, motor vehicle 102 may select a subset of remote vehicles that may allow for the most accurate calculation of the absolute position of motor vehicle 102. In some cases, motor vehicle 102 may select the subset of remote vehicles of set of remote vehicles 920 that are relatively close to motor vehicle 102 and also spread evenly around motor vehicle 102. This arrangement may allow for an increase in the accuracy of an absolute position calculation.

Figure 9:
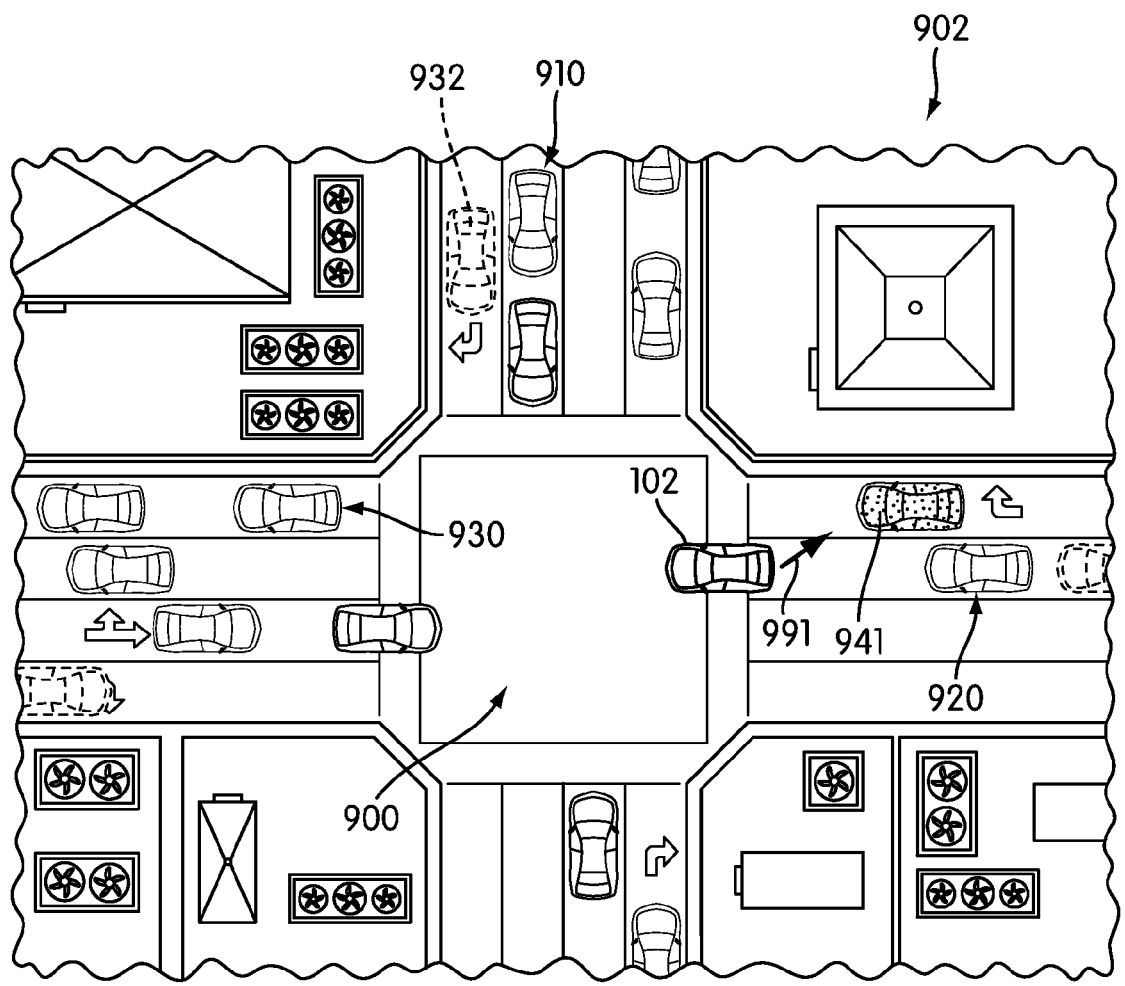
FIG. 9 is a schematic view of an embodiment of a method of selecting a subset of remote sources for use in determining an absolute position for a motor vehicle.
Figure 10:
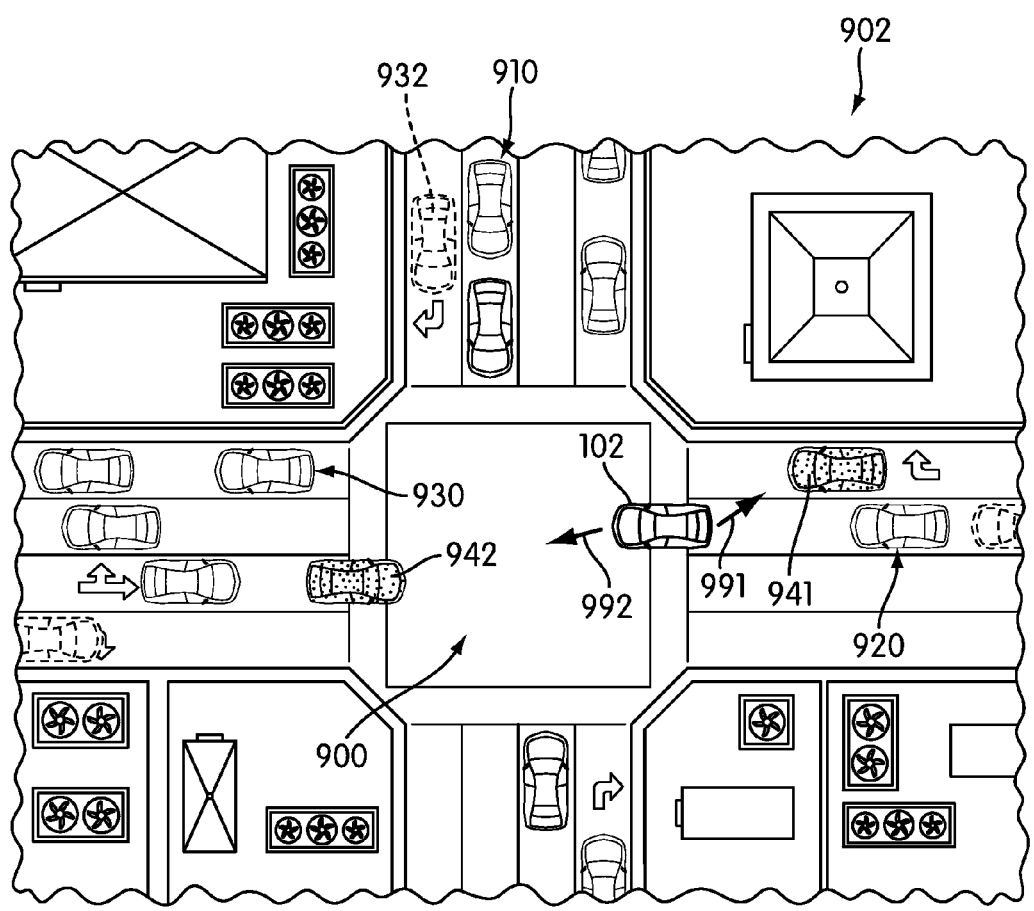
FIG. 10 is a schematic view of an embodiment of a method of selecting a subset of remote sources for use in determining an absolute position for a motor vehicle.

Referring to FIG. 9, motor vehicle 102 may begin by selecting first remote vehicle 941, since first remote vehicle 941 is closest to motor vehicle 102. Next, as seen in FIG. 10, motor vehicle 102 may select second remote vehicle 942, which is disposed approximately in an opposite direction of first remote vehicle 941 with respect to motor vehicle 102. For example, in the current embodiment, first remote vehicle 941 is oriented in first direction 991 from motor vehicle 102. First direction 991 is oriented approximately behind motor vehicle 102. Second remote vehicle 942 is oriented in second direction 992 from motor vehicle 102. In this case, second direction 992 is oriented in front of motor vehicle 102 and in the approximately opposite direction of first direction 991.

Figure 11:
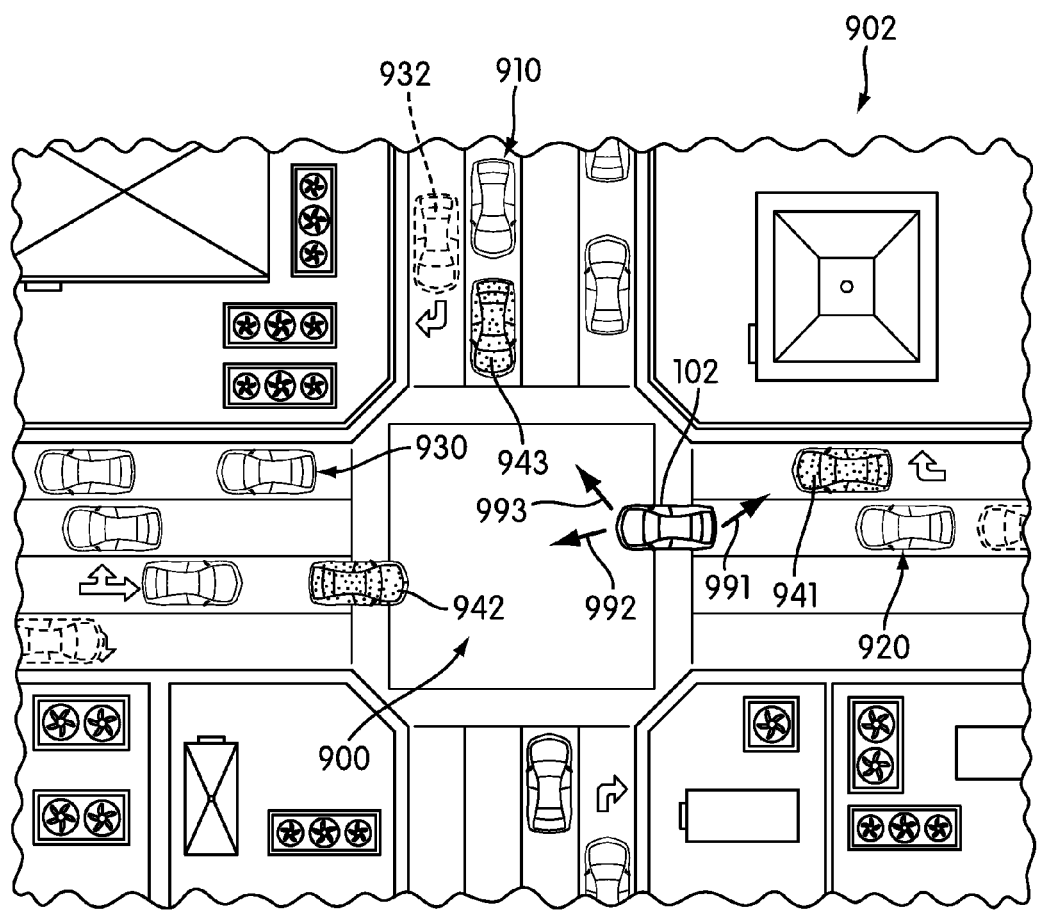
FIG. 11 is a schematic view of an embodiment of a method of selecting a subset of remote sources for use in determining an absolute position for a motor vehicle.
Figure 12:
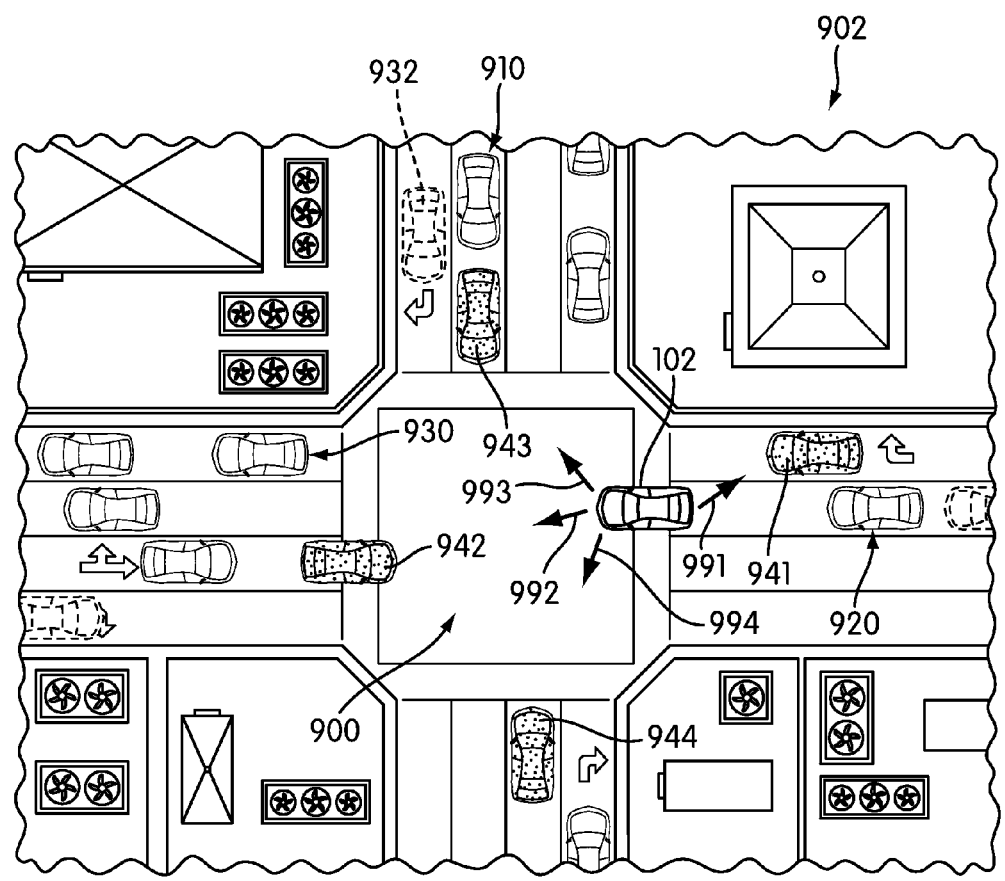
FIG. 12 is a schematic view of an embodiment of a method of selecting a subset of remote sources for use in determining an absolute position for a motor vehicle.

At this point, as seen in FIG. 11, motor vehicle 102 may select third remote vehicle 943. Third remote vehicle 943 is the next closest vehicle to motor vehicle 102 that is disposed in a direction oriented approximately between first remote vehicle 941 and second remote vehicle 942. In particular, in third remote vehicle 102 is oriented in third direction 993 from motor vehicle 102, which is approximately between first direction 991 and second direction 992. Next, as seen in FIG. 12, motor vehicle 102 may select fourth remote vehicle 944, which is oriented in fourth direction 994 from motor vehicle 102. Fourth direction 994 is a direction approximately opposite of third direction 993.

Using this method, a subset of remote vehicles that are disposed relatively close to motor vehicle 102 and that are spread out in multiple different directions around motor vehicle 102 may be used to calculate an absolute position for motor vehicle 102. In particular, the absolute position of motor vehicle 102 may be calculated using only information received from first remote vehicle 941, second remote vehicle 942, third remote vehicle 943 and fourth remote vehicle 944, which comprise a subset of set of remote vehicles 920. Using this method helps provide an even distribution of remote vehicles around motor vehicle 102 whose position and distance information may be used to calculate an absolute position for motor vehicle 102.

It will be understood that the method discussed above can be used with any kinds of remote sources and is not limited to use with remote vehicles. In other cases, this method could be used for selecting a subset of different types of remote sources that are in line of sight and spread around motor vehicle 102 in all directions. Although the current embodiment illustrates the use of this method with four remote sources, in other embodiments, this method could be used to determine any other number of remote sources that are substantially evenly distributed around motor vehicle 102.

It will be understood that this method may be substantially continuously applied to all remote sources within range of motor vehicle 102. This allows for a substantially continuous updated subset of remote sources that are within line of sight and spread substantially evenly around motor vehicle 102. Using this arrangement, the absolute position of motor vehicle 102 to be accurately determined in dynamic situations where the relative positions of remote sources with respect to motor vehicle 102 are constantly changing.

Figure 13:
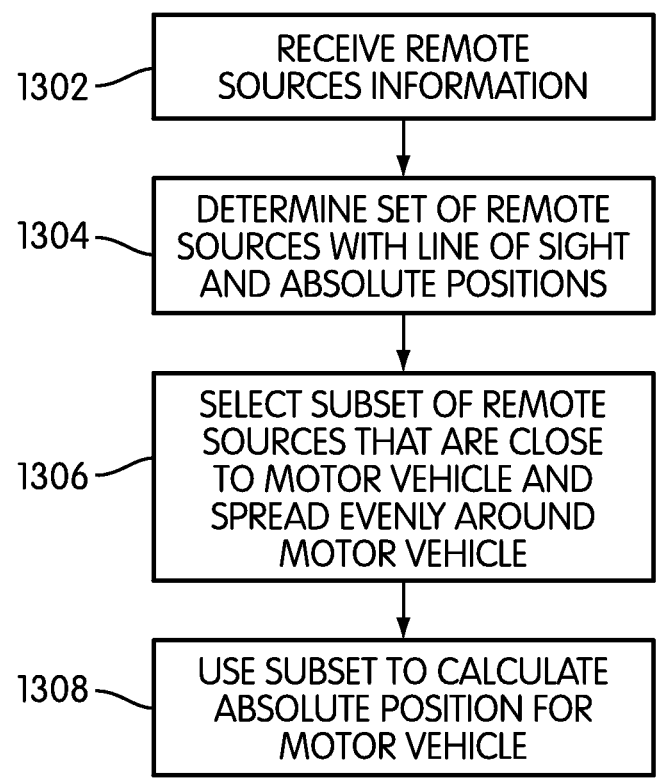
FIG. 13 is an embodiment of a process of selecting a subset of remote sources for use in determining an absolute position for a motor vehicle.

FIG. 13 illustrates an embodiment of a process for selecting a subset of remote vehicles to be used in calculating an absolute position for a host vehicle. In some embodiments, some of the following steps could be accomplished by an electronic control unit of the host vehicle. For example, in the current embodiment, one or more steps could be performed by ECU 120 of motor vehicle 102. In other embodiments, some of the following steps could be accomplished by other components of a host vehicle. It will be understood that in other embodiments one or more of the following steps may be optional.

During first step 1302, ECU 120 may receive information from a plurality of remote sources. This information may be received from remote vehicles, roadside units, satellites, as well as any other kind of remote sources. Furthermore, this information can be received on a vehicle communications network or any other network used for exchanging information between the host vehicle and one or more remote sources.

Next, during step 1304, ECU 120 may determine the set of remote sources that are within the line of sight of motor vehicle 102 and that also have known absolute positions. Any methods discussed above for determining line of sight conditions can be used. Sources that transmit information without absolute position information may be ignored for purposes of calculating an absolute position for motor vehicle 102.

Following step 1304, during step 1306, ECU 120 may select a subset of remote sources that are close to motor vehicle 102 and that are spread approximately evenly (in all directions) around motor vehicle 102. Following this, during step 1308, ECU 120 may calculate the absolute position of motor vehicle 102 using the subset of remote vehicles selected during step 1306. In particular, ECU 120 may use the distances to the remote vehicles as well as the absolute positions of the remote vehicles in the subset selected during step 1306.

Figure 14:
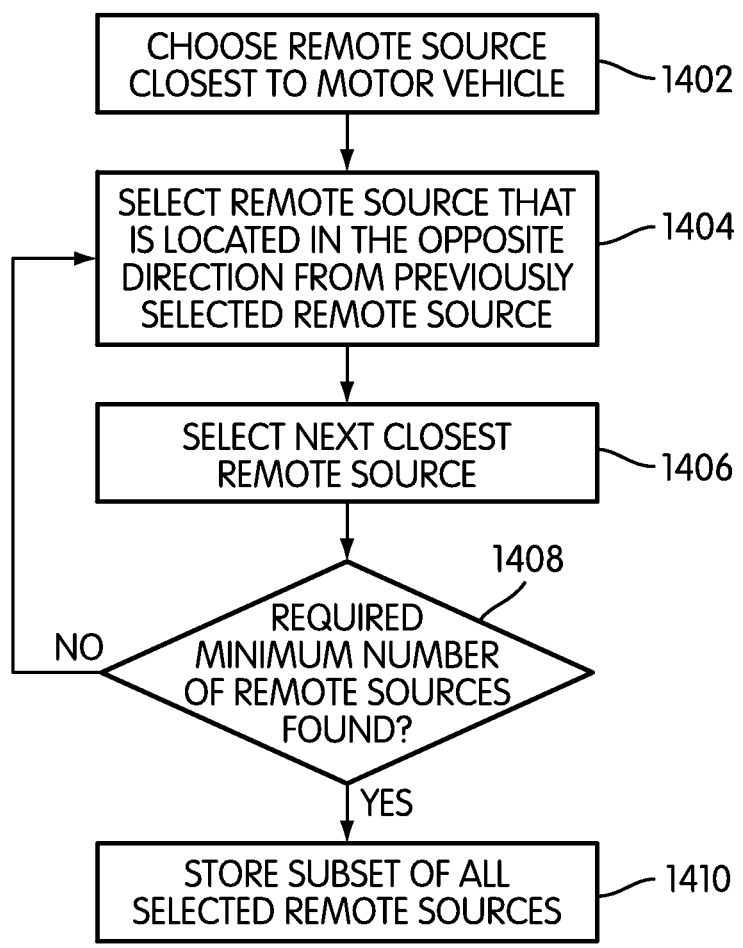
FIG. 14 is an embodiment of a process of selecting a subset of remote sources for use in determining an absolute position for a motor vehicle.

FIG. 14 illustrates an embodiment of a detailed process for selecting a subset of remote vehicles that are approximately spread in all directions around a host vehicle. In some embodiments, some of the following steps could be accomplished by an electronic control unit of the host vehicle. For example, in the current embodiment, one or more steps could be performed by ECU 120 of motor vehicle 102. In other embodiments, some of the following steps could be accomplished by other components of a host vehicle. It will be understood that in other embodiments one or more of the following steps may be optional.

During step 1402, ECU 120 may choose a remote source closest to motor vehicle 102. The distances to each remote source can be determined using the methods discussed above. For example, in some cases, the distances to each remote source can be determined using information about the received signal strength index of signals from each remote source. Next, during step 1404, ECU 120 may select a remote source that is disposed in an approximately opposite direction of the previously selected remote source with respect to motor vehicle 102. Following this, during step 1406, ECU 120 may select the next closest remote source. Next, at step 1408, ECU 120 may determine if the minimum number of remote sources required has been found. If not, ECU 120 may proceed back to step 1404 to select another remote source. Otherwise, ECU 120 may proceed to step 1410 where the subset of remote sources selected during the routine is stored for use in calculating the absolute position of motor vehicle 102.

In some embodiments, a subset of remote sources can be selected using a fault detection and exclusion (FDE) method. An example of a fault detection and exclusion methods as applied to satellites can be found in U.S. Pat. No. 5,841,399, to Yu, the entirety of which is hereby incorporated by reference. In other embodiments, other types of fault detection and exclusion methods can be used.

Figure 15:
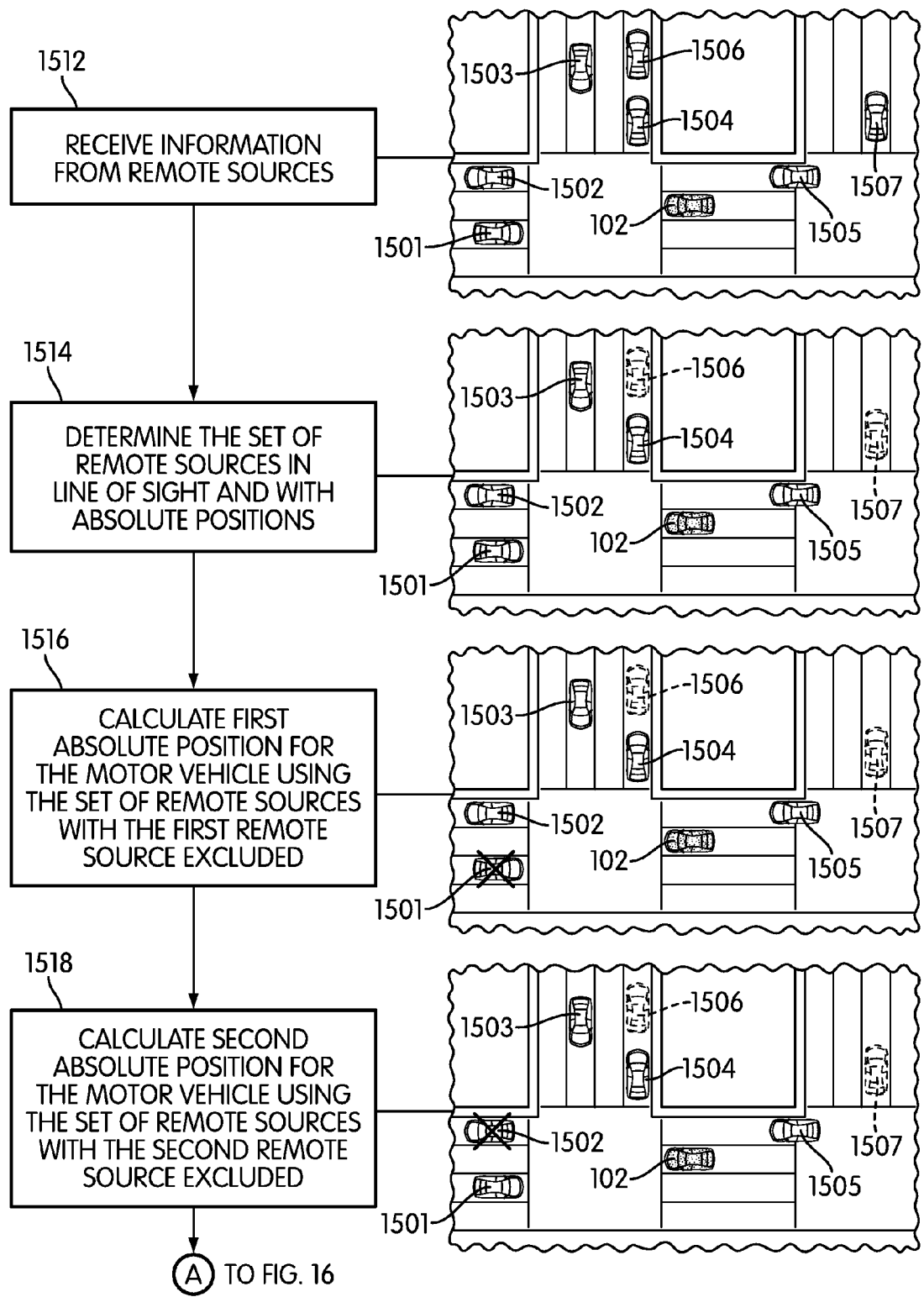
FIG. 15 is an embodiment of some steps in a process of selecting a subset of remote sources for use in determining an absolute position for a motor vehicle.
Figure 16:
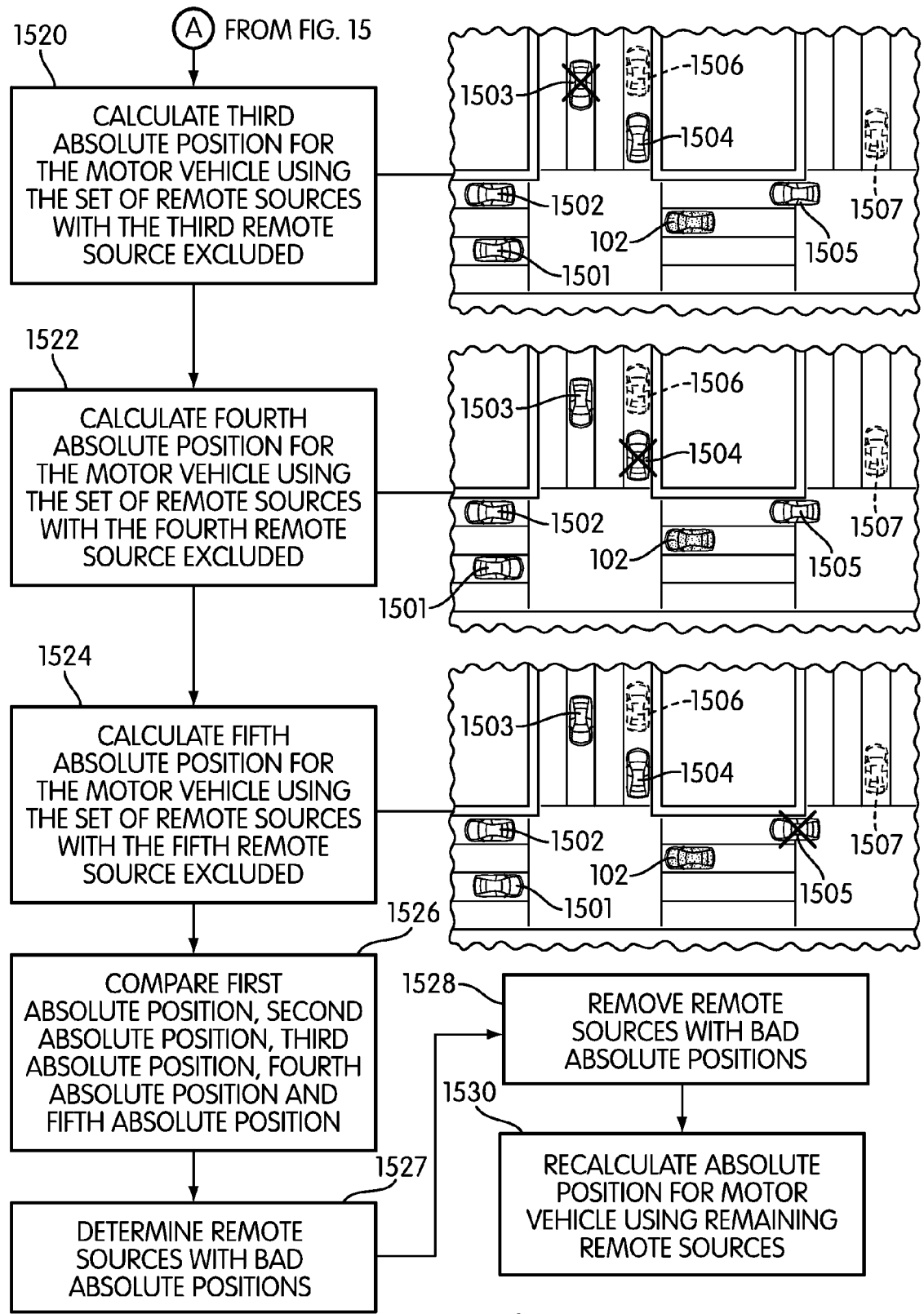
FIG. 16 is a continuation of the embodiment of the process shown in FIG. 15.

FIGS. 15 and 16 illustrate another embodiment of a process for selecting a subset of remote sources to be used in calculating an absolute position for a host vehicle. In particular, in some cases, the steps shown in FIG. 15 may be succeeded by the steps shown in FIG. 16. In some embodiments, some of the following steps could be accomplished by an electronic control unit of the host vehicle. For example, in the current embodiment, one or more steps could be performed by ECU 120 of motor vehicle 102. In other embodiments, some of the following steps could be accomplished by other components of a host vehicle. It will be understood that in other embodiments one or more of the following steps may be optional.

For purposes of clarity, some steps of the process shown in FIGS. 15 and 16 are illustrated schematically to the right of the corresponding step. Although the current embodiment illustrates a method of selecting a subset of remote vehicles, it should be understood that in other embodiments the method could be used to select a subset of remote sources including remote vehicles, roadside units, satellites and/or other remote sources. For example, in another embodiment, the process described and shown in FIGS. 15 and 16 could be used for selecting a subset of remote sources comprising a combination of remote vehicles, roadside units and satellites.

During step 1512, ECU 120 may receive information from one or more remote sources. In the current embodiment, ECU 120 may receive information from first remote source 1501, second remote source 1502, third remote source 1503, fourth remote source 1504, fifth remote source 1505, sixth remote source 1506 and seventh remote source 1507. In this embodiment, each remote source is a remote vehicle. However, in other embodiments, the remote sources could be any other kinds of remote sources including roadside units and satellites.

Next, during step 1514, ECU 120 may determine the set of remote sources that are in the line of sight of motor vehicle 102 and that have absolute positions. In the current embodiment, this set includes first remote source 1501, second remote source 1502, third remote source 1503, fourth remote source 1504 and fifth remote source 1505. In this case, sixth remote source 1506 and seventh remote source 1507 are not within the line of sight of motor vehicle 102 and therefore have been excluded from the set.

In order to determine a subset of remote sources to be used in calculating the absolute position for motor vehicle 102, ECU 120 may be configured to calculate multiple different solutions for the absolute position using various different subgroups of remote sources. Since the integrity of information from each remote source may vary, this method may provide a way determining the sources with the most accurate position information. In particular, this method may be used to determine remote sources with low integrity, or low accuracy, position information. These sources may then be excluded from the subset of remote sources used to determine the absolute position of motor vehicle 102.

Following step 1514, during step 1516, ECU 120 may calculate a first absolute position for motor vehicle 102 using the set of remote sources with first remote source 1501 excluded. In other words, ECU 120 may only use position information received from second remote source 1502, third remote source 1503, fourth remote source 1504 and fifth remote source 1505 to determine an absolute position for motor vehicle 102. This information may include both the absolute positions of each remote source and the relative distance from motor vehicle 102 to each source.

Next, during step 1518, ECU 120 may calculate a second absolute position for motor vehicle 102 using the set of remote sources with second remote source 1502 excluded. In other words, ECU 120 may only use position information received from first remote source 1501, third remote source 1503, fourth remote source 1504 and fifth remote source 1505 to determine an absolute position for motor vehicle 102.

Next, during step 1520, ECU 120 may calculate a third absolute position for motor vehicle 102 using the set of remote sources with third remote source 1503 excluded. In other words, ECU 120 may only use position information received from first remote source 1501, second remote source 1502, fourth remote source 1504 and fifth remote source 1505 to determine an absolute position for motor vehicle 102.

Next, during step 1522, ECU 120 may calculate a fourth absolute position for motor vehicle 102 using the set of remote sources with fourth remote source 1504 excluded. In other words, ECU 120 may only use position information received from first remote source 1501, second remote source 1502, third remote source 1503 and fifth remote source 1505 to determine an absolute position for motor vehicle 102.

Next, during step 1524, ECU 120 may calculate a fifth absolute position for motor vehicle 102 using the set of remote sources with fifth remote source 1505 excluded. In other words, ECU 120 may only use position information received from first remote source 1501, second remote source 1502, third remote source 1503 and fourth remote source 1504 to determine an absolute position for motor vehicle 102.

After a solution for the absolute position of motor vehicle 102 has been calculated for each possible group of four remote sources, ECU 120 may compare the different absolute positions during step 1526. In other words, ECU 120 may compare the first absolute position, the second absolute position, the third absolute position, the fourth absolute position and the fifth absolute position that correspond to the five different possible groups of four remote sources. In different embodiments, ECU 120 may compare each absolute position in different manners. In some cases, ECU 120 may be configured to compute one or more test statistics associated with each absolute position. Examples of various test statistics that may be used are known in the art. In other cases, the convergence or divergence of the solutions associated with each absolute position may be compared. In still other cases, each absolute position can be compared in any other manner. The terms "converge" and "diverge" as used throughout the specification and claims mean "converge statistically" and "diverge statistically," as determined by standard deviation or the presence of outliers, for example. Accordingly, in calculating the first absolute position of motor vehicle 102 during step 1506, a plurality of absolute positions for motor vehicle 102 may be separately determined based upon position information received from each of second remote source 1502, third remote source 1503, fourth remote source 1504 and fifth remote source 1506, and one or more statistics may be computed based upon the plurality of separately-determined absolute positions. In turn, the solution associated with the calculation of the first absolute position for motor vehicle 102 converges when the plurality of separately-determined absolute positions statistically converge (as determined by, for example, a low standard deviation or the absence of outliers), and diverges when the plurality of separately-determined absolute positions statistically diverge (as determined by, for example, a high standard deviation or the presence of outliers).

Using this arrangement, ECU 120 may be capable of detecting any remote sources with bad absolute positions during step 1527. For example, in a situation where the solution associated with the first absolute position converges while the solutions associated with the second absolute position, the third absolute position, the fourth absolute position and the fifth absolute position each diverge, then ECU 120 may determine that first remote source 1501 has a bad absolute position. The absolute position of first remote source 1501 may be determined as being a bad absolute position because the solution associated with the calculation of the first absolute position (which converges) does not depend upon information from first source 1501, while the solutions associated with the calculations of the second absolute position, third absolute position, fourth absolute position and fifth absolute position (which diverge) depend upon information from first source 1501.

Following step 1527, during step 1528, ECU 120 may remove any remote sources associated with bad absolute positions from the set of remote sources. Next, during step 1530, ECU 120 may recalculate an absolute position for motor vehicle 102 using the remaining remote sources. This method may be used to find a subset of remote sources that can be used to find an accurate absolute position for motor vehicle 102.

The current embodiment can be generalized to situations where there is any number of remote sources within communication range of motor vehicle 102. For example, the following embodiment generalizes the method to situations that include N remote sources that are within line of sight of motor vehicle 102 and that have absolute positions. In different situations, the value of N may vary. For example, in highly congested urban areas, the number of remote sources within line of sight of motor vehicle 102 and with absolute positions can be ten or more.

Figure 17:
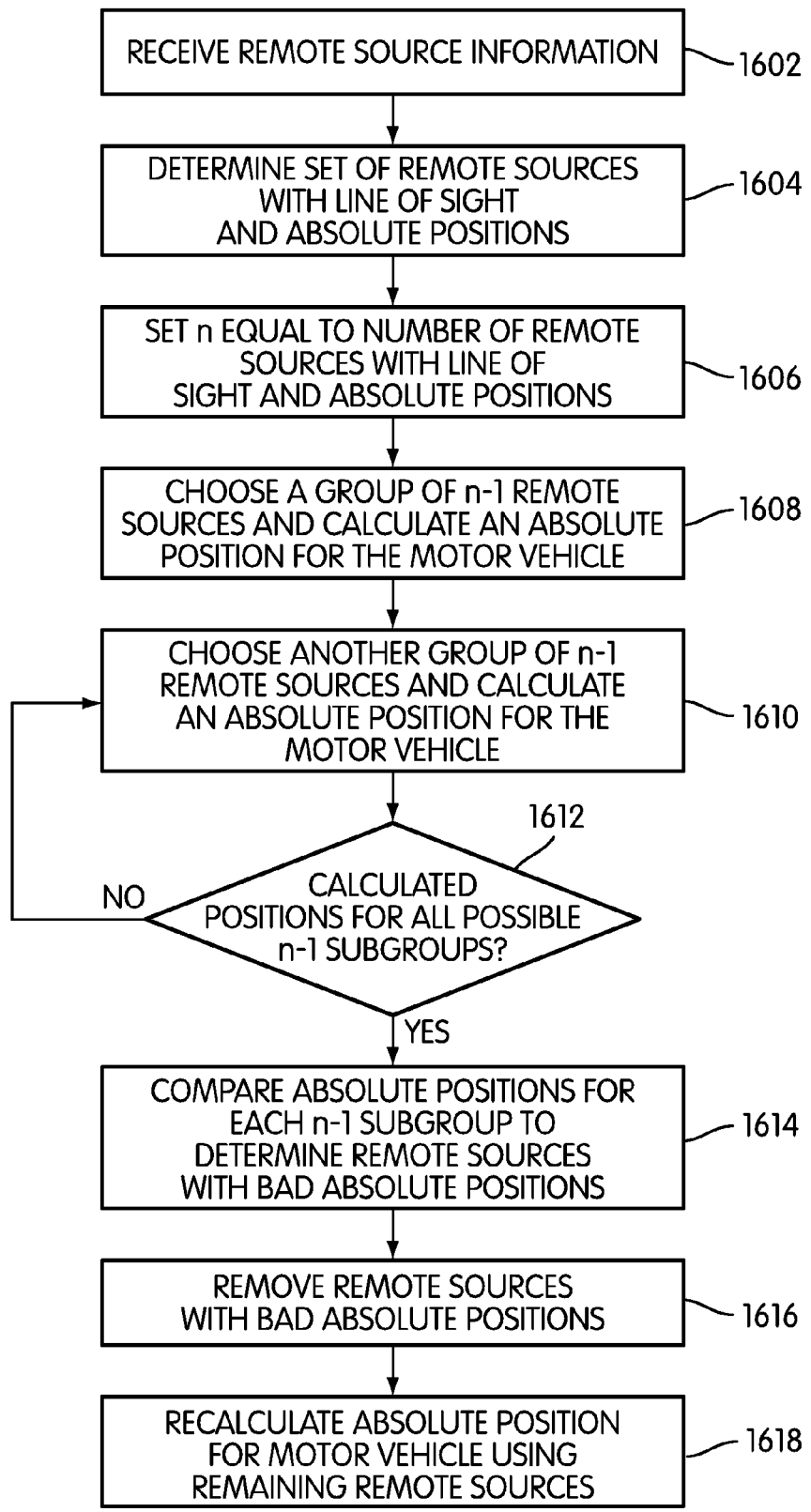
FIG. 17 is an embodiment of a process of selecting a subset of remote sources for use in determining an absolute position for a motor vehicle.

FIG. 17 illustrates another embodiment of a process for selecting a subset of remote sources to be used in calculating an absolute position for a host vehicle. In some embodiments, some of the following steps could be accomplished by an electronic control unit of the host vehicle. For example, in the current embodiment, one or more steps could be performed by ECU 120 of motor vehicle 102. In other embodiments, some of the following steps could be accomplished by other components of a host vehicle. It will be understood that in other embodiments one or more of the following steps may be optional.

During step 1602, ECU 120 may receive information from one or more remote sources. Next, during step 1604, ECU 120 may determine the set of remote sources that are in the line of sight of motor vehicle 102 and that have absolute positions.

Next, during step 1606, ECU 120 may set N equal to the number of remote sources that are within line of sight of motor vehicle 102 and that have absolute positions. After step 1606, during step 1608, ECU 120 may choose a group of N−1 remote sources and calculate an absolute position for motor vehicle 102. In other words, ECU 120 may select a subgroup of remote vehicles with one vehicle excluded, as was discussed in the method illustrated in FIGS. 15 and 16. Following this, during steep 1610, ECU 120 may choose another group of N−1 remote sources and calculate an absolute position for motor vehicle 102. Next, during step 1612, ECU 120 may determine if an absolute position has been calculated corresponding to all possible N−1 subgroups. If not, ECU 120 may return to step 1610 to choose another subgroup. Otherwise, ECU 120 may proceed to step 1614.

During step 1614, ECU 120 may compare the absolute positions calculated for each N−1 subgroup to determine the remote sources that have bad absolute positions. This comparison can be made using any of the methods discussed above. In some cases, test statistics associated with each absolute position can be computed and compared. In other cases, the convergence and/or divergence of the solutions associated with each absolute position can be compared. At this point, ECU 120 may then proceed to step 1616. During step 1616, ECU 120 may remove any remote sources associated with bad absolute positions (such as a remote source that has provided position information causing the solutions associated with the calculations of one or more absolute positions to diverge). In some cases, the absolute position of motor vehicle 102 may be affected by incorrectly estimated distances to other remote sources. Therefore, in some embodiments, during step 1616, ECU 120 could also remove any remote sources associated with incorrectly estimated distances between the remote sources and motor vehicle 102. Next, during step 1618, ECU 120 may recalculate an absolute position for motor vehicle 102 using the remaining remote sources.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of determining an absolute position for a motor vehicle including an electronic control unit, the electronic control unit being configured to perform the method comprising the steps of:
   receiving signals via a communication system, the signals containing information from a plurality of remote sources within a communication range of the communication system, the information including an absolute position for each remote source;
   selecting a set of remote sources of the plurality of remote sources that are in line of sight of the motor vehicle;
   excluding any remote sources of the plurality of remote sources that are not in line of sight of the motor vehicle;
   determining a distance to each remote source in the set of remote sources;
   selecting a subset of remote sources from the set of remote sources that are spread approximately evenly around the motor vehicle; and
   calculating the absolute position of the motor vehicle using the absolute position of each remote source in the subset of remote sources and using the distance to each remote source in the subset of remote sources.

2. The method according to claim 1, wherein the distance to each remote source is determined using information related to a received signal strength index.

3. The method according to claim 2, wherein the distance to each remote source is determined using historical received signal strength index information.

4. The method according to claim 1, wherein the motor vehicle is configured to receive absolute position information from at least four remote sources.

5. The method according to claim 4, wherein the motor vehicle is configured to determine distances between the motor vehicle and each of the at least four remote sources using information related to a received signal strength index.

6. The method according to claim 5, wherein the absolute positions of the at least four remote sources and the distances to the at least four remote sources are used to calculate the absolute position of the motor vehicle.

7. The method according to claim 1, wherein at least one of the remote sources in the subset of remote sources is a remote vehicle.

8. The method according to claim 1, wherein at least one of the remote sources in the subset of remote sources is a roadside unit.

9. The method according to claim 1, wherein at least one of the remote sources in the subset of remote sources is a satellite.

10. The method according to claim 1, wherein the step of selecting the subset of remote sources further includes the steps of:
    selecting a first remote source from the set of remote vehicles, the first remote source being closest to the motor vehicle; and
    selecting a second remote source from the set of remote sources, the second remote source being disposed in a direction approximately opposite of a direction of the first remote source with respect to the motor vehicle.

11. The method according to claim 10, wherein the method further includes a step of selecting a third remote source that is disposed in a direction approximately between the direction of the first remote source and the direction of the second remote source.

12. The method according to claim 11, wherein the method further includes a step of selecting a fourth remote vehicle that is disposed in an approximately opposite direction from the third remote source.

13. The method according to claim 1, wherein the absolute position of the motor vehicle is a GPS position.

14. A method of determining an absolute position for a motor vehicle including an electronic control unit, the electronic control unit being configured to perform the method comprising the steps of:
    receiving information from a plurality of remote sources, the information including an absolute position for each remote source;
    selecting a set of remote sources of the plurality of remote sources that are in line of sight of the motor vehicle, the set of remote sources including at least three remote sources;
    excluding any remote sources of the plurality of remote sources that are not in line of sight of the motor vehicle;
    determining a distance to each remote source in the set of remote sources;
    calculating a first absolute position for the motor vehicle using the set of remote sources with a first remote source excluded;
    calculating a second absolute position for the motor vehicle using the set of remote sources with a second remote source excluded;
    calculating a third absolute position for the motor vehicle using the set of remote sources with a third remote source excluded;
    comparing the solutions associated with the calculation of the first absolute position, the calculation of the second absolute position, and the calculation of the third absolute position to detect a divergent solution;
    identifying one or more remote sources with bad absolute positions from the set of remote sources used to calculate the divergent solution; and
    recalculating the absolute position of the motor vehicle using the set of remote sources that excludes the one or more remote sources with bad absolute positions.

15. The method according to claim 14, wherein the method includes a step of determining the number of remote sources in the set of remote sources.

16. The method according to claim 15, wherein the method includes:
    selecting a subset of remote sources from the set of remote sources that are spread approximately evenly around the motor vehicle; and
    calculating the absolute position of the motor vehicle using the absolute position of each remote source in the subset of remote sources and using the distance to each remote source in the subset of remote sources.

17. The method according to claim 14, wherein the method includes the further steps of:
    determining that the set of remote sources includes N remote sources;
    calculating a plurality of absolute positions for the motor vehicle using information received from a plurality of different groups of remote sources, each group comprising N−1 remote sources;

comparing the solutions associated with the calculations of the plurality of absolute positions for the motor vehicle corresponding to each group to detect a divergent solution;

identifying one or more remote sources with bad absolute positions from the set of remote sources used to calculate the divergent solution; and recalculating the absolute position of the motor vehicle using the set of remote sources that excludes the one or more remote sources with bad absolute positions.

18. The method according to claim 17, wherein the method includes a step of removing remote sources associated with incorrectly estimated distances between the motor vehicle and the remote sources.

19. The method according to claim 14, wherein the set of remote sources includes at least one remote vehicle and at least one roadside unit.

20. The method according to claim 14, wherein the set of remote sources includes at least four remote vehicles.

21. The method according to claim 14, wherein the distance is an estimated distance.

22. The method according to claim 14, wherein the set of remote sources includes at least one remote vehicle and at least one satellite.

23. The method according to claim 14, wherein the set of remote sources includes at least one roadside unit and at least one satellite.

24. The method according to claim 14, wherein the set of remote sources includes at least one roadside unit, at least one remote vehicle, and at least one satellite.

* * * * *